United States Patent

Nielsen

[15] 3,677,146
[45] July 18, 1972

[54] DATA SOURCE MICROFILM RECORDER WITH FORMS OVERLAY

[72] Inventor: Asger T. Nielsen, San Diego, Calif.
[73] Assignee: Compufoto, Inc., Wellesley Hills, Mass.
[22] Filed: May 19, 1970
[21] Appl. No.: 38,718

[52] U.S. Cl. .................................. 95/1.1, 353/36, 355/20, 355/39, 355/79
[51] Int. Cl. ........................................... G03b 17/24
[58] Field of Search ......................... 95/1.1; 355/20, 79, 39; 352/87, 90; 353/30, 34, 36, 37

[56] References Cited

UNITED STATES PATENTS

| 3,506,351 | 4/1970 | Geitz | 353/37 X |
| 3,240,114 | 3/1966 | Jonker et al. | 355/20 |
| 3,233,507 | 2/1966 | Baruch | 353/30 |
| 2,961,920 | 11/1960 | Sachtleben | 355/20 |

*Primary Examiner*—Samuel S. Matthews
*Assistant Examiner*—Richard L. Moses
*Attorney*—John Noel Williams

[57] ABSTRACT

Microfilm apparatus in which a data-generated light display is combined with preprinted overlay information to produce superposed photographs. Featured are a logic system producing a sequential search through a stored series of transparencies with feedback ensuring proper selection of overlay transparency; mounting and positioning of the transparencies by means ensuring alignment; an axially centered disc form rotary transparency carrier together with a detent assembly precisely positioning the transparency and excluding transverse shift; and hard copy input systems sharing portions of the parts of the system, including the camera and in certain embodiments the light source, the screen mounting, the boresight or monitor and the beam combiner.

20 Claims, 12 Drawing Figures

DATA SOURCE MICROFILM RECORDER WITH FORMS OVERLAY

An object of this invention is to provide an improved microfilm recorder device having forms overlay capability which is operated by a data source such as a computer.

Another object of this invention is to do the foregoing in a simple and efficient manner which at the same time insures accurate registration of the forms with the data, and provides sufficient forms for the average user.

Other objects are: to eliminate the possibility of human error in selecting the wrong form without letting the data source know that the wrong form is inserted; to improve the ability to register a form during successive insertions; to avoid natural vibrations of the device from causing a displacement of the form relative to the information generated on the display, and to provide for hard copy input to the recorder.

One feature of the invention is to mount transparencies that provide the forms on a form carrier comprising a radially stiff disc with light projected through the transparencies on an axis parallel to the axis of the disc. The disc is located by its central axis and a transverse locking device takes up any bearing play in the direction transverse to the axis. Vibrations of the disc cause movement in a direction parallel to the optical axis and would change the focal plane of the disc relative to the film rather than change the actual location of the form transparency transversely relative to the film. The depth of focus in the optical system, made several times greater than the possible movement in the direction of the axis, ensures a clear microphotograph. Alignment of the transparency is made relative to the data display path before the transparency is locked into position in the disc and on successive insertions of the disc alignment between the transparencies and the data display is ensured because the disc is located with reference only to its axis of rotation. The one point support of the disc is improved by the locking device that guarantees proper circumferential location of the disc. In preferred embodiments the rotating disc is located annularly by a detent mechanism where a pin is forced into a semi-circular slot along the circumference of the disc and is therefore in compression between that pin and the axis of rotation. This eliminates any possible variation in transverse position due to bearing play.

Furthermore the sides of the slot, being convergent, enable the detent, as it enters the slot, to adjust the disc circumferentially, the motor and gears being automatically disengaged from the disc whenever de-energized, making the disc free to turn under the pressure of the seating detent.

Another feature of the system is means enabling a number of transparencies to be selected on computer command without the operator being required to select, read, or verify. This is done with a code arrangement associated with each individual transparency. In the preferred embodiment it consists of selected areas on the transparency set aside for an on-off code word or structure. Selection of a transparency is achieved by receiving a demand code word from the source, interrogating the code structure on the transparency that is in the read position and verifying agreement or disagreement between the two. Only in the case of agreement is the forms carrier stopped. As long as the two code words disagree the carrier will continue and move another transparency into position for interrogation. In the case that all of the transparencies have been interrogated and the proper one has not been found, the system will automatically stop, notify the computer and the operator will be notified.

A feature of the invention is that the code structure is interrogated while the form carrier is moving continuously. This eliminates the need for start and stop everytime a transparency has been moved into read position. This is achieved by utilizing a pulsed-light source that pulses, e.g., at 100 pulses per second and by utilizing extremely fast photo transistors so that the entire identification cycle is extremely short compared to the annular movement of the disc.

The code structure is associated intimately with the transparency rather than with the disc, meaning that a misalignment cannot possibly exist between transparencies, code dots and photo sensors.

Mounting and aligning slides is accomplished with a transparency which is located with reference to the optical axis of the system. The display is located with reference to this generator. Then additional transparencies are located with reference to the CRT display. Means ensuring that all code dots are in proper alignment at the time the photo transistors are read enables the photo transistors to be interrogated while the disc is moving. This is achieved by making the dot farthest away from the center of rotation only half the size of the others. It is not used as part of the code but as an indicator, to indicate the proper time at which to interrogate the others. The movement of the disc may be approximately 20 minutes of arc for the time it takes to interrogate the photo transistors while the opening that provides the code structure may be on the order of 1.2°. The variables involved in this sensing are primarily the difference in sensitivity of the photo transistors and it is therefore important to have a substantial amount of light through the openings that are used for the code structure. The proper timing of this inspection is guaranteed by letting the light-sensing photo transistor, the one farthest away from the center, look through a considerably smaller opening than is used for the code structure.

Another feature of the invention is the sharing of components with a hard copy input system. Sharing the camera is accomplished through an optic system.

A further feature of the invention is as follows: the vertical disc rotating around a horizontal axis provides ample space behind the disc, behind meaning on the opposite side from the camera, for a hard copy input device. The hard copy input device can then consist of a lamp, partially silvered mirror mounted at 45° to the horizontal optical axis and an exposure station. Light from the light source penetrates the partially silvered mirror, illuminates the hard copy light, is reflected from it back to the mirror where it is reflected along the horizontal axis through an optical system and projected on the rear side of a matte-glass plate mounted at the same location as a form side.

Light is sensed by the photocells described earlier and the photocells will therefore be useful to determine whether light was generated or not, and provide an interlock with the operating system. Light for illumination of the slides or transparencies in case the hard copy input is not used will be provided the following way. The same lamp is used as used for the hard copy input. The same lamp mounted below the 45° mirror will be used for the form slides also. Light from the lamp again penetrates the mirror but is now reflected from a mirror surface which ordinarily is located behind the hard copy when that is inserted, reflected from the mirror surface back towards the 45° mirror through its optical system and illuminates the entire slide area. This system requires that one additional light sensor is mounted on the same side of the 45° mirror as the lamp. It will merely indicate that light was generated when the equipment was commanded to do so.

The rear projection system just described will enable merger on the same page information from the hard copy input with information from the CRT. It will be done in the following manner. A portion of the hard copy input will be blanked off so that light will not be reflected and enter the camera lens. This will be the area that will be used for computer generated information instead, that information being generated on the CRT and superimposed on the hard copy input merged on the film.

Another solution to the problem of entering hard copy information with computer generated information would be to utilize two separate optical systems and a switching arrangement from one to another by moving two lenses. This will make it necessary to provide an interlock between the lens position and the ability to accept information from the computer to prevent information being generated on the CRT but not photographed on film due to the fact that the wrong letters were in position.

According to still another feature a second beam combiner is employed to combine the combined beam of CRT and overlay systems with the hard copy input beam, so that all three are aligned and can be provided in various combinations.

These and other features and advantages will be understood from the following description of preferred embodiments.

In the drawings

FIG. 7 is a representation of the lens change mechanism of the embodiment while

Figure 1:
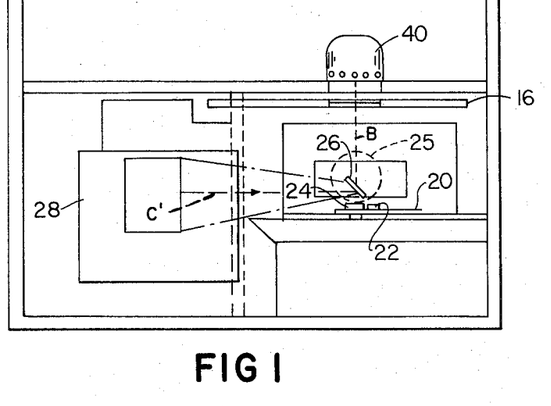
FIGS. 1, 2 and 3 are top, front and side views of a preferred computer output microfilm recorder according to the invention.
Figure 2:
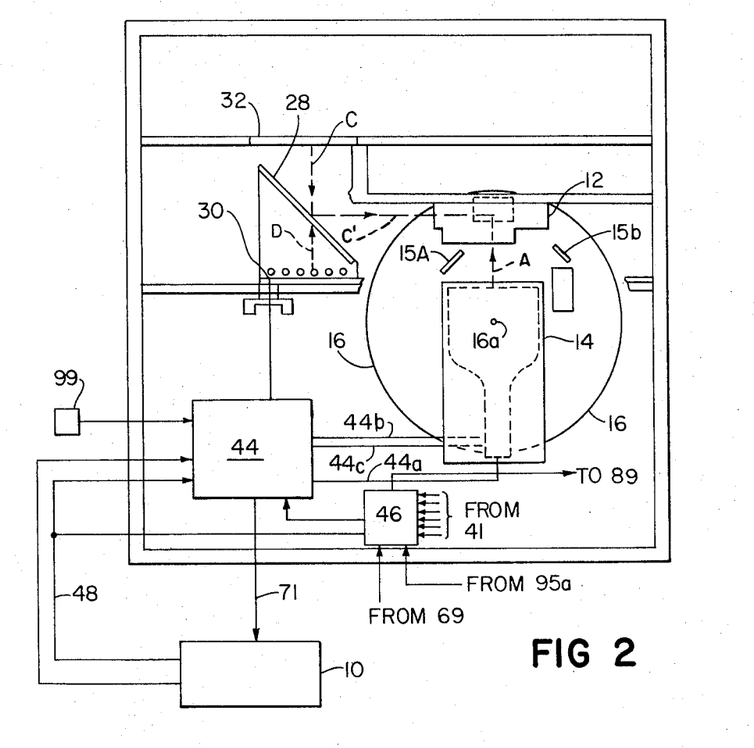
Figure 3:
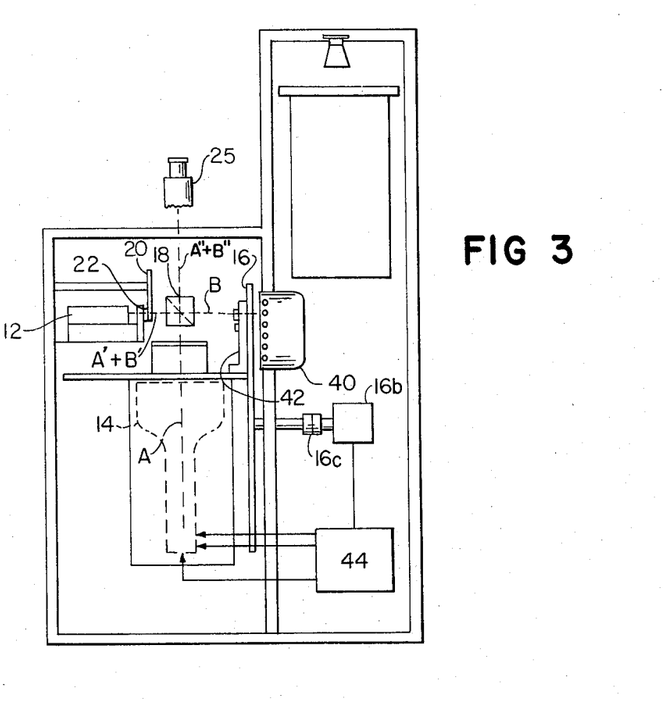

Referring to the preferred embodiment of FIGS. 1, 2 and 3, digital signals from an external data source 10 such as a computer are received by a logic and generator system 44. System 44 converts the digital signals to signals representing alphanumeric characters or other visual information which are applied over lines 44a, 44b and 44c to CRT 14, thus creating a display of the information on the cathode ray tube 14. The information thus displayed on the face of the tube is photographed on film moved past an aperture plate in camera 12. Preprinted information selected by the computer can be superimposed on the information generated on the CRT 14 and photographed as one image by the camera 12. An input separate from those just described is provided through the hard copy input exposure station 32 by moving a separate lens into the optical path. In this manner alternate frames can be photographed of either hard copy information or merged computer-generated and preprinted information.

More specifically, the following components are involved in the recorder. Light from the CRT 14 is emitted upwardly along a vertical path A on FIG. 3. It meets a glass prism 18 which comprises two 45° prisms joined face-to-face on the hypotenuse to form a beam combiner cube. At the combiner prism 18 approximately 50 percent of the light is reflected from the 45° reflective surface inside the prism, emerging on a horizontal path to the left, path A', while the other 50 percent of the light proceeds in a vertical path A'' through the upper surface of the prism. The light reflected by the prism proceeds through a camera lens 22 to the camera exposure station at the film transport, while the path following the vertical exit from the prism 18 passes through a bore sight 25 into an eyepiece where it can be viewed by the observer. A second light path on FIG. 3 originates in light box 40, passes through transparencies carrying preprinted information, the transparencies being mounted on the form carrier 16. This light B enters the right face of prism 18, and half of it continues along in a horizontal path B' through the camera lens to the film exposure station while the other half is reflected by the reflective surface inside the prism, emerges in a vertical direction along path B'' and passes through the bore sight to the eyepiece. Light A' generated on the face of the CRT 14 and light B' passing through the transparency on form carrier 16 is merged by the beam combiner and can be photographed as one image in the camera. At the same time light means A'' and B'' are also merged along the vertical path passing through the bore sight to the eyepiece where it can be viewed by the observer as one image. A third and a fourth light path, C and D on FIG. 2, provide an additional input to the camera by means of a second lens 24 on FIG. 1. Light from light source 30 on FIG. 2 travels along a vertical path D passing through a partial mirror 28 and impinges on the exposure station 32. Light reflected from the input located at exposure station 32 is reflected vertically downwards towards mirror 28 where the major portion of it is reflected following a horizontal path C' to the right of mirror 28. It proceeds along this horizontal path C' to mirror 26, FIGS. 1 and 9, where it is reflected in a 90° angle through the lens 24 into the camera 12.

Figure 4:
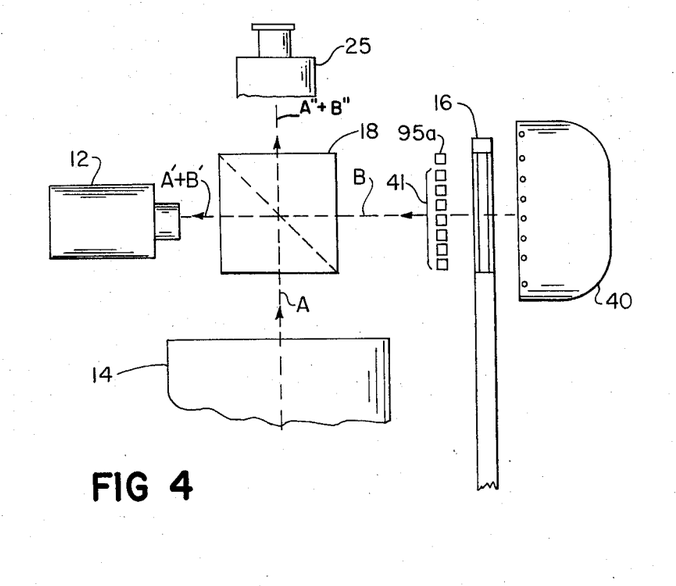
FIG. 4 is a partially diagrammatic view of parts of FIG. 2 on a larger scale.
Figure 5:
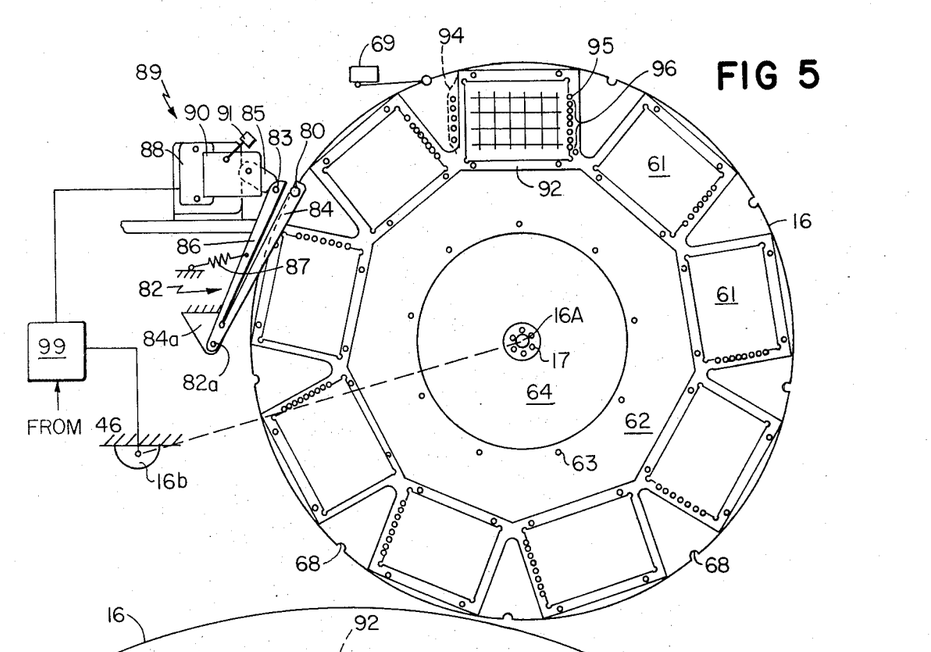
FIG. 5 is a front view of the form carrier of the embodiment.
Figure 6:
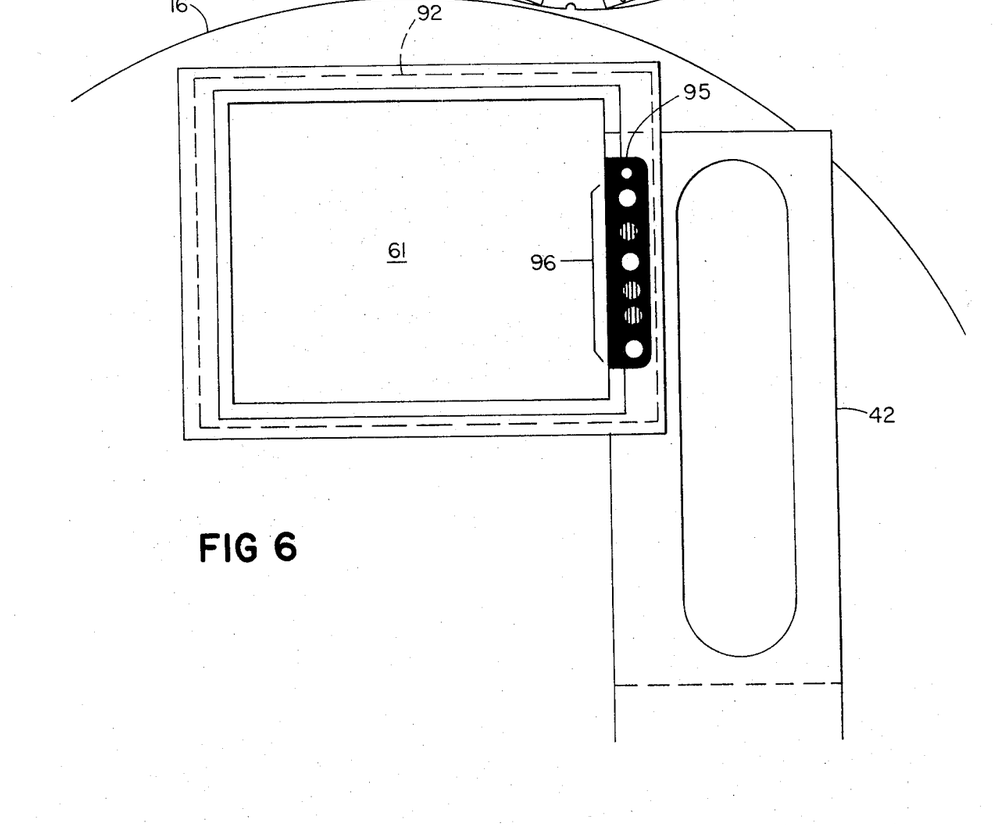
FIG. 6 is a representation of the code reader structure relative to a form slide employed in the embodiment.

The form carrier 16 shown on FIG. 2 is positioned by and rotated around horizontal shaft 16a, by bearing 17. The form carrier 16 is shown in greater detail on FIG. 5. It consists of a flat vertically disposed disc with cut-outs for transparencies in the form of glass slides 61. It is rotated by a motor 16b. Also shown on FIG. 5 is a locking mechanism 89 which consists of the following parts: a locking pin 80 is mounted on an arm 84 of member 82 which is pivoted at point 82a. Another arm 86 of member 82 is moved by cam 85 which is turned by motor 88 through gear box 90. The pivot point 82a is supported on bracket 84a which is fixed relative to the reference plane. A spring 87 pulls the arm assembly 82 towards the cam 85. The locking pin 80 engages with cutouts 68 on the form carrier 16. The form carrier 16 consists of a flat annular disc 62 which is mounted on a hub 64 which again is supported by ball bearing 17 which are fixed relative to the reference plane. The annular disc 62 can be disengaged from the hub 64 by loosening nine screws 62. Nine large openings are provided in the annular ring for the form slides 61. They are cutouts of rectangular shape but have an additional cutout 96 on one side. This cutout enables light from the light source 40 (FIGS. 3 and 4) to pass through the glass slides and enter into the photo transistors mounted on bracket 42 shown on FIGS. 3 and 6. The glass slides carrying the form as a photo negative are mounted in the openings. Each is held in place by two clamps 94 that can be tightened after the slide has been adjusted to its proper location. The slide is aligned utilizing the image on the CRT 14 as a reference. The borescope 25 will enable the operator to view the two images, that of the CRT and that of the form simultaneously, move the form physically until the two images coincide, and then lock the forms in its position with clamp 94.

The stability of the slide alignment is maintained in the following way: light from light source 40 on FIG. 3 passes through the slide, is combined with light from the CRT 14, into one image, passed through lens 22 on FIG. 1 and photographed in camera 12. When a slide is brought into position the second time it is very important to assure that its location is identical to the location it was in the last time it was used.

The form carrier 16 is very rigid in a radial direction. It now becomes important to prevent the disc from rotating. This is accomplished by driving locking pin 80, FIG. 5, into slot 68 in the circumference of the disc. In this manner a very rigid triangle is established between points 16a, the center of the disc, 80, the locking pin, and 82a, the pivot point for arm 82. The rigidity of the triangle is maintained by a force exerted by cam 85 which is driven by motor 88 through gear box 90. The force exerted by the cam 85 is transmitted through cam follower 83 to arm 86 which is joined to arm 84 to which the locking pin 80 is mounted. The alignment of motor 88 is such that a slight overdrive by cam 85 causes bending deflection of arm 86 in relationship to arm 84. In this manner the spring force is transmitted to locking pin 80 and the reaction force is transmitted through pivot point 82a to the reference support for this mechanism.

The possible effect of play in bearing 16a, pivot point 82a and locking pin 80 versus peripheral disc cutout 68 is now prevented from influencing the location of slide 61 because they are all driven in a predictable direction which will guarantee good repeatability of the slide location. It is noted that this provides a very rigid system which prevents the slide 61 from moving transversely in relationship to the display on the CRT 14. Should vibration occur it will not be in a plane that will cause the slides to move transversely relative to the CRT 14 but rather in a direction that is parallel to the horizontal optical axis B, which the optics system depth of field can readily accommodate. Whatever change in proportions that may occur due to such axial motion will be minor and no detrimental transverse or sideways displacement will occur.

The various slides or transparencies that can be mounted on form carrier 16 are selected by a code received from the external data source such as a computer over line 48. In this embodiment the code consists of up to 128 combinations which is accomplished by binary coding of seven bits. The system provides the capability for verification of the code word or code structure on the individual slide versus the code structure that is demanded by the external source. This verification takes place in the logic system 44 where the code demand has been received through lines 48. The code structure on a given slide is identified the following way: light source 40 emits light through cutout 63 on the form carrier 16. That particular area on slide 61 is used to provide eight predetermined transparent or opaque areas on the glass slide. Light that is transmitted through these transparent areas is sensed by eight photo transistors 41 mounted on bracket 42 shown on FIGS. 3 and 4. The levels that are sensed by the photo transistors are transmitted back to their logic system 46, FIG. 2. In the logic system this set of signals is compared to the set of signals that were received from the external source as described before. If there is agreement between the two codes the system will continue its normal functioning, this condition being signaled to logic and control system 44. If there is not agreement a signal will be sent back to the motor control logic 89 on FIG. 5. This causes motor 88 to be energized, cam 85 turns and locking pin 80 is moved out of slots 68 by the spring 87. When cam 88 has gone through approximately 180° it actuates a micro-switch which interrupts the current to motor 88 causing the cam to stop in this position. At the same time micro-switch 91 causes motor 16b to start and begin to turn the form carrier 16. At the same time the main logic system 44 on FIG. 3 has caused lamp 40 to be pulsed continuously; form carrier 16 continues to move and when micro-switch 69 senses a slot 68 the photo transistors are interrogated by the logic system 46. Outer transparent area 95 on glass slide 61 is considerably smaller than the other areas in the code cutout there labeled 96. This fact is utilized in the following way: contact closure in micro-switch 69 indicates to the logic 46 that the time is approaching when the photo transistors 41 should be interrogated. But the exact time is determined by the photo transistor 95a opposite the small transparent area 95. Since the light source was pulsed continuously that photo transistor will sense the opening 95, and because opening 95 is considerably smaller than the other openings, there is a good guarantee that the photo transistors corresponding to openings 96 are in the proper location. It is therefore the signal from photo transistor 95a opposite opening 95 that controls the exact time for the interrogation of the code transistors.

The interrogation of the code transistors is accomplished in some few microseconds while the form carrier 16 is still moving. Also accomplished in a very short time is the comparison of that code structure with the demand code structure from the external source 10. If logic 46 senses that the two are in agreement the logic causes an interruption of the current for motor 16b. At the very moment the motor current is interrupted the armature in motor 16b disengages from the gear box and this causes the form carrier to stop with an accuracy of approximately ± ½°.

The motor control logic 89 energizes motor 88 and the locking pin 80 is driven into its position engaging with slot 68. The wide opening at the entrance to slot 68 will enable locking pin 80 to be seated properly even if errors up to ± 1 ½° should exist. In so doing the movement of the locking pin will cause the form carrier, now released from the motor, to be rotated into its absolutely accurate position.

The movement of the carrier 16 and the interrogation just described will continue until the proper slide code structure has been found or until all nine slides have been interrogated. A counter in motor control logic 89 will at that time notify the logic 44 that all nine slide positions have been interrogated and the proper code has not been found. This will cause a signal to be returned to the external source along line 71 where it can be utilized for hard copy print-out as is customary on a typewriter associated with the external source. In this manner the operator is notified that the proper slide has not been found and he can replace the entire form carrier 16 with another one that carries the slide that was demanded. This particular form carrier has been designed for the user who has the need for up to eight individual slides. Should the user need slides beyond the eight he can have them installed on additional form carriers that can be mounted on the microfilm recorder.

For the user who would require several form carriers a suitable modification would consist of an automatic replacement mechanism for the form carriers. The carriers would be stored in a magazine inside the equipment and would be moved into position and locked on the axis 16a in a manner similar to the change of phonograph discs. This system provides a guarantee that a form carrier will be properly registered because it has a one point support.

Figure 7:
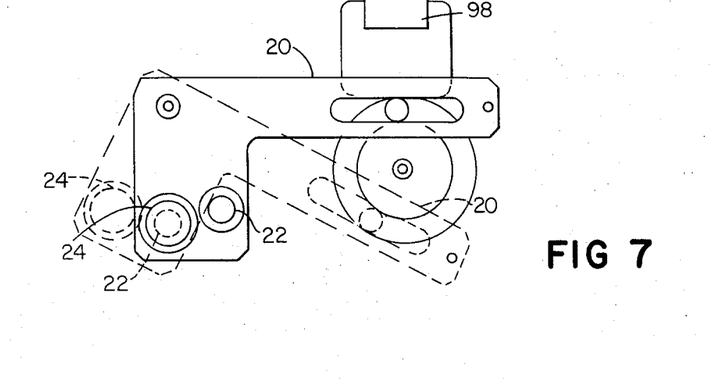
Figure 8:
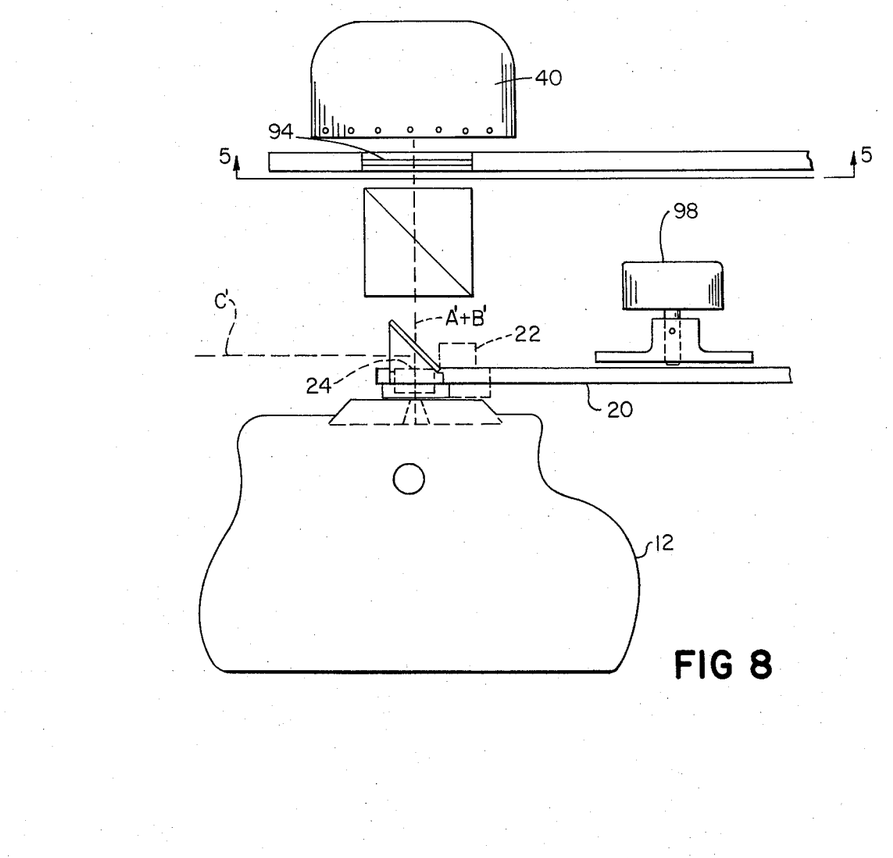
FIG. 8 is a representation of the lens position when hard copy is being recorded.

FIG. 7 shows lens 22 which is used when information is photographed from the CRT and the form projector as previously described. Lens 22 is mounted on arm 20 which is moved by motor 98. Another lens 24 also shown on FIG. 7 is used for hard copy input. FIG. 8 shows lens 24 and mirror 26 moved into the optical path. Under normal operation optical path A' and B' as shown on FIG. 3 will pass through lens 22, but as shown on FIG. 8 they are interrupted by mirror 26. Instead optical path C' which is shown on FIG. 2 will cause reflection in mirror 26 and optical path C' will be directed through the lens 24 into the camera where it will be focused at the film plane.

Motor 98 drives the arm 20 which moves either lens 24 or lens 22 into position. It is actuated manually by a push button 99 operated by the operator.

Figure 9:
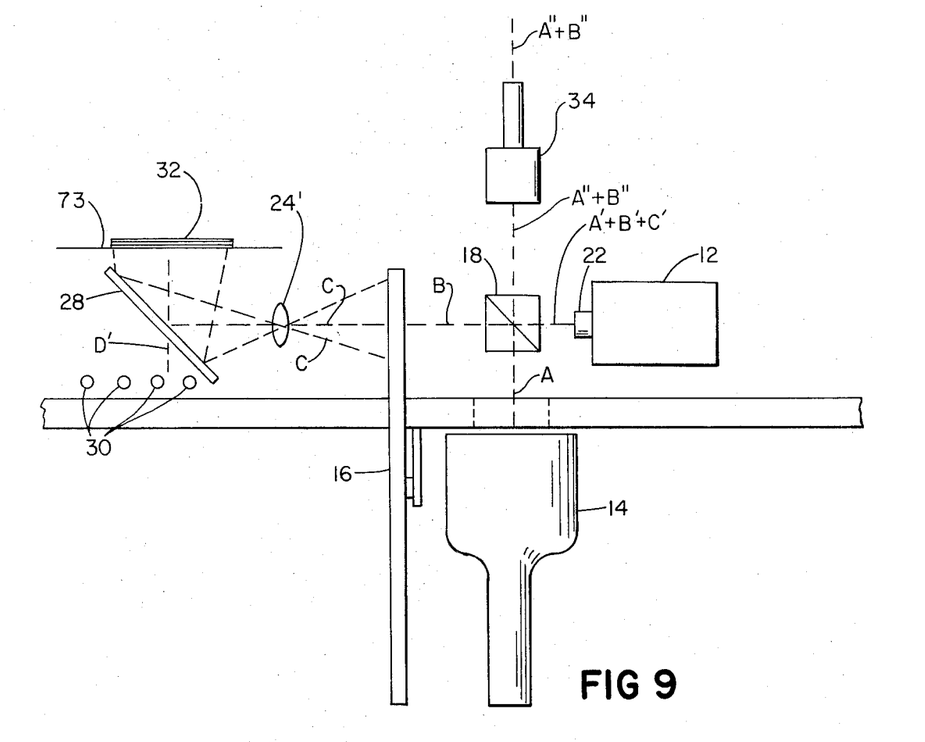
FIG. 9 is a view similar to FIG. 3 of another preferred embodiment of the invention.

Referring now to FIG. 9, in another preferred embodiment of the invention, the hard copy input with its optical axis C has been positioned in such a way that optical axis C is in the same direction as optical axis B. A hard copy lens 24' is inserted between the form carrier 16 and the hard copy exposure station 32. The following components, hard copy lens 24', mirror 28, lamp 30 and exposure station 32 form a projection system which causes an image of the hard copy to be projected and focused at the form slide plane. The image will be projected on a matte glass plate inserted in the form carrier 16 and moved into position when the hard copy input is going to be used. Light from the image formed in this manner will pass through the beam combiner 18 and be photographed by camera 12. This light will be following an optical path C through the beam combiner just the same as light in path B from a form that is to be superimposed with light from the CRT following optical path A. In this case light source 30 is used not only for hard copy illumination but also for ordinary form illumination. In the latter case a mirror 73 is substituted for the hard copy and directs all light back to partially silvered mirror and thence to lens 24'.

As before, part of the light from the various sources entering combiner 18 will move upwardly and can be observed through the boresight 34. By use of the boresight it is possible to provide proper alignment between the hard copy input from station 32 and the information generated on the CRT 14.

Figure 11:
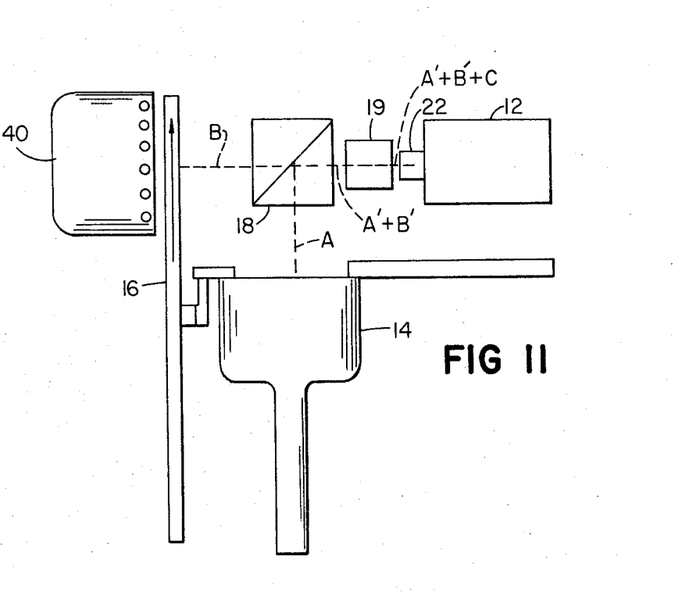
Figure 12:
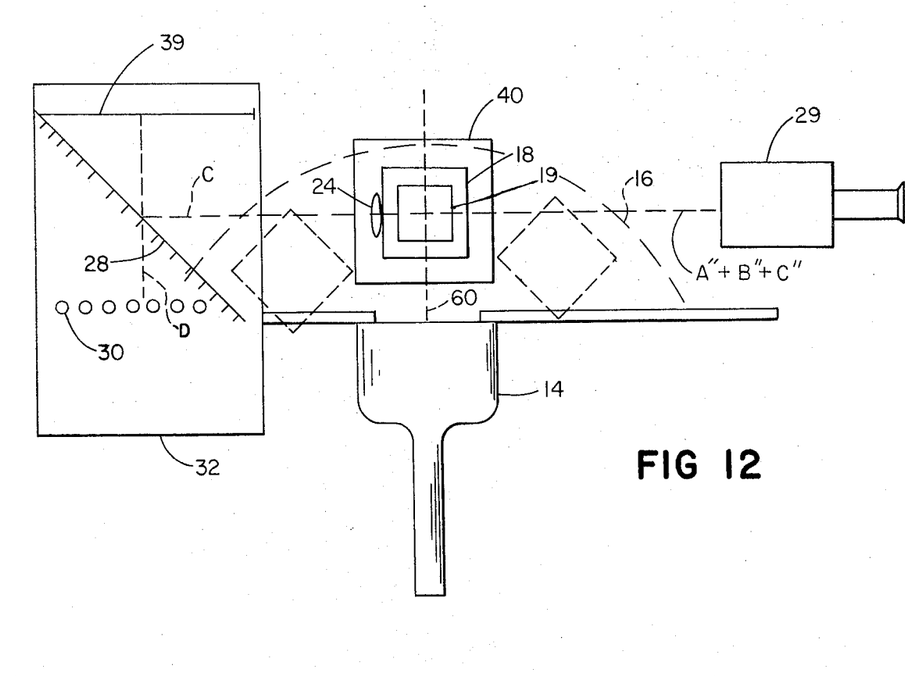

In some applications of this invention, it will be desirable to be able to combine an image from a hard copy source with the images from the computer output and the form slide. In such cases, and for other appropriate circumstances the embodiment as shown in FIGS. 10, 11 and 12 is preferred.

Figure 10:
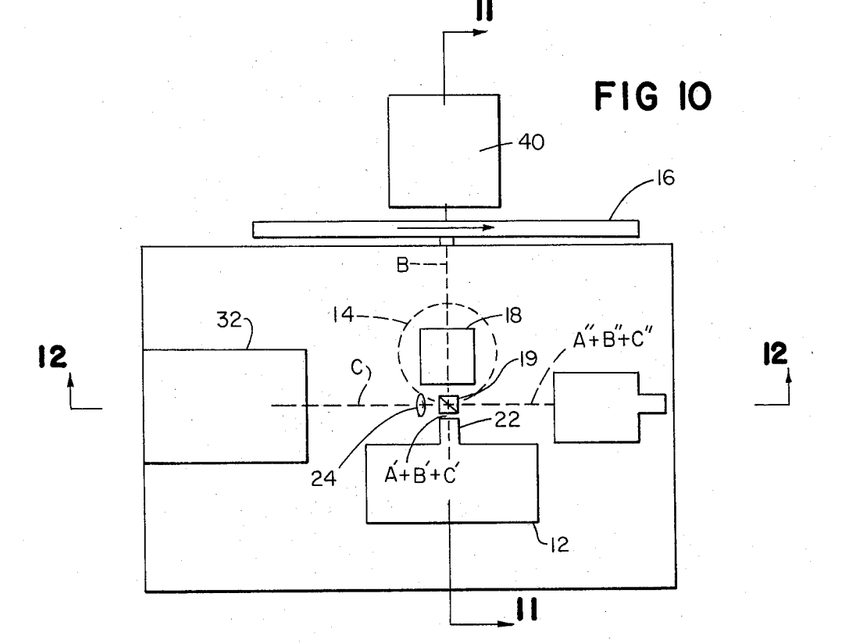
FIGS. 10, 11, and 12 are views similar to FIGS. 1, 2 and 3 of another preferred embodiment of the invention.

In FIG. 10, a plan view of the apparatus, a hard copy projector is shown at 32a. As seen in vertical section view FIG. 12, the hard copy projector 32a comprises a light source 30, half-silvered mirror 28, and support 39 for the copy. Light from source 30 follows path D, is reflected from the copy and then from mirror 28 along path C through lens 24 into auxiliary combiner 19, see FIGS. 10 and 11. As in the previously described embodiment, the image from form slide carrier 16 is projected along path B to combiner 18, which combines the form image with the image from cathode ray tube 14, projected along light path A. In the present embodiment, the combined images from form slide 16 and cathode ray tube 14 are now combined by auxiliary combiner 19 with the hard copy image, and the two or three combined images, or one only if only one system is energized, is photographed by camera 12 along paths A' + B' + C'. Furthermore a combined beam passes from the side of combiner 19 along paths A" + B" + C" to reach monitor or borescope 29. Thus the operator, using monitor 29, can align the images from all three sources.

Numerous modifications of the details shown will be understood and are within the scope of the invention.

I claim:

1. In a microfilm apparatus comprising a camera, a display system upon which a data-generated light display appears for photographing in response to signals from a data source, a preprinted overlay system for producing images of preprinted information to be merged with the data-generated display, and optics for merging the light rays from said two systems for photographing by said camera, the improvement wherein said overlay system comprises a series of transparencies mounted for movement serially through a predetermined projection position aligned with said optics, a logic circuit for receiving designating signals from said data source designating a transparency to be selected for merging with the light from said data-generated display, identifying code indicia associated with each transparency, a sensor for sensing the identity of a transparency aligned with said optics and generating a sensing signal, said logic circuit adapted to compare said designating and sensing signals, drive means for moving said series of transparencies adapted to be energized when said comparison does not show identity of the designating and sensing signals to sequentially move further of said transparencies sequentially into position.

2. The apparatus of claim 1 wherein said logic circuit is adapted to cause said drive means to operate through the entire sequence of transparencies in its search and in the event of not finding the specified transparency, adapted to de-energize said drive means and generate a signal indicating failure to find said designated transparency.

3. The apparatus of claim 1 including a mechanical lock system responsive to said logic means to lock a selected transparency in place when said comparison shows agreement between said selection signal and said sensing signal.

4. The apparatus of claim 3 wherein said transparencies are mounted about the periphery of a rotary carrier member and said lock system comprises a detent that engages a formation in a portion of said rotary carrier member spaced from the axis thereof.

5. The apparatus of claim 1 wherein said overlay system comprises a rotary carrier adapted to mount said series of transparencies, said code indicia being incorporated in each of said transparencies, said transparencies being initially adjustable relative to said carrier to simultaneously align the respective preprinted matter with said optics and said identifying code indicia with said sensor.

6. The apparatus of claim 5 wherein said code indicia comprise a series of markings on each said transparency disposed at varying radial distance from the center of said carrier, and a read indicium disposed radially outwardly of said code indicia and being smaller than said markings, said read indicium being transparent on all of said transparencies and a sensor positioned to sense light passing through said read indicia, and code reading logic responsive to a sensed read indicia for reading the code word appearing at the other markings.

7. The apparatus of claim 6 wherein said code reading logic and said drive means are cooperatively adapted to enable reading of said code during movement of said rotary carrier.

8. In a microfilm apparatus comprising a camera, a display system upon which a data-generated light display appears for photographing in response to signals from a data source, a preprinted overlay system for producing images of preprinted information to be merged with the data-generated display, and optics for merging the light rays from said two systems for photographing by said camera, the improvement wherein said overlay system comprises a series of transparencies mounted for movement serially through a predetermined projection position aligned with said optics, said transparencies mounted on a planar carrier member that is positioned and mounted for rotation by a central member, said transparencies being substantially aligned with the plane of said carrier member at right angles to the axis of its rotation, and distributed about the rotational center of said carrier member, said optics including a light source for directing light through said transparencies to said camera, the path of light through said transparencies being substantially parallel to the axis of rotation of said carrier member, means effective when a selected transparency is in position, for pressing said carrier member in a predetermined direction transverse to its axis thereby to place said transparency in a predetermined position despite bearing play in the mounting of said carrier member wherein said means comprises a motor driven cam responsive to a search logic means for selecting a transparency from said rotatable carrier, and a detent member positioned to be driven by said cam into a formation in said carrier, thereby to lock said selected transparency in place and simultaneously press said carrier member in said predetermined direction.

9. The microfilm apparatus of claim 8 wherein said detent member comprises a rotary member having two arms which are resiliently deflectable relative to one another, one of said arms supporting the portion arranged to be engaged by said cam and the other supporting the portion arranged to engage said carrier member.

10. In a microfilm apparatus comprising a camera, a display system upon which a data-generated light display appears for photographing in response to signals from a data source, a preprinted overlay system for producing images of preprinted information to be merged with the data-generated display, and optics for merging the light rays from said two systems for photographing by said camera, the improvement wherein said overlay system comprises a series of transparencies mounted for movement serially through a predetermined projection position aligned with said optics, said transparencies mounted on a planar carrier member that is positioned and mounted for rotation by a central member, said transparencies being substantially aligned with the plane of said carrier member at right angles to the axis of its rotation, and distributed about the rotational center of said carrier member, said optics including a light source for directing light through said transparencies to said camera, the path of light through said transparencies being substantially parallel to the axis of rotation of said carrier member the apparatus including a motor adapted to rotate said carrier member in response to a control means for selecting a transparency for projection, means for disengaging said motor from said carrier after the proper transparency has been selected whereby said carrier is free to rotate and a positioning member responsive to said control means, said positioning member being operable to engage a formation on said carrier member and precisely position said carrier member with reference to said formation.

11. The microfilm apparatus of claim 10 wherein said formation is defined by a slot on the periphery of said carrier member having converging sides and said positioning member comprises a detent urged into said slot, and bearing on said converging sides to center the carrier relative to the region of convergence of said slots sides.

12. The microfilm apparatus of claim 11 including means to urge said detent member with a radial component relative to said carrier member to predictably urge said carrier member to one side within the freedom provided by bearing tolerance.

13. The microfilm apparatus of claim 12 wherein said positioning member has two elongated arms joined together, one of said arms being resiliently deflectable, a selection motor and cam arrangement for pressing one of said arms toward said carrier member when a transparency is to be selected and said second arm carrying a detent adapted thereby to be resiliently urged into the respective slot of said carrier member.

14. In a microfilm apparatus comprising a camera, a display system upon which a data-generated light display appears for photographing in response to signals from a data source, a preprinted overlay system for producing images of preprinted information to be merged with the data-generated display, and optics for merging the light rays from said two systems for photographing by said camera, the improvement wherein said overlay system comprises a series of transparencies mounted for movement serially through a predetermined projection position aligned with said optics, said transparencies mounted on a planar carrier member that is positioned and mounted for rotation by a central member, said transparencies being substantially aligned with the plane of said carrier member at right angles to the axis of its rotation, and distributed about the rotational center of said carrier member, said optics including a light source for directing light through said transparencies to said camera, the path of light through said transparencies being substantially parallel to the axis of rotation of said carrier member wherein said carrier member carries a screen upon which an image can be projected for photographing by said camera.

15. The microfilm apparatus of claim 14 including a hard copy illumination station adapted to project an image of hard copy onto said screen.

16. The microfilm apparatus of claim 15 in which said hard copy illumination station comprises a horizontal transparent surface for receiving hard copy, face down, a light source below said surface for illuminating said hard copy, an angular mirror directing light reflected from said hard copy towards said camera and a lens arranged to focus light from said mirror upon a transparent screen on said form carrier, the light from said image passing through said screen along the normal path for light from said transparencies to said camera.

17. The microfilm apparatus of claim 16 wherein said illumination system for said hard copy input is adapted to illuminate a transparency when it is aligned in projection position of said form carrier.

18. The microfilm apparatus of claim 17 including a mirror surface positionable in the path of said illuminating light for said hard copy station adapted to direct all light toward said lens for illumination of said transparency.

19. A microfilm apparatus comprising a camera, a display system upon which a data-generated light display appears for photographing in response to signals from a data source, a preprinted overlay system for producing images of preprinted information to be merged with the data-generated display, and optics for merging the light rays from said two systems for photographing in combination with a hard copy input system and means for directing light from said input system with said camera wherein a first beam combiner device is positioned to receive and combine beams of light from said display and overlay systems to produce a combined beam extending at an angle to the beam from said hard copy system and a movable optic system associated with said camera adapted to selectively receive said combined beam or said hard copy beam.

20. The microfilm system of claim 19 including as a display device an upwardly facing cathode ray tube, said combiner positioned above the face of said tube and arranged to combine a vertically moving beam from said tube with a horizontally travelling beam from said preprinted overlay system, thereby to produce a horizontally disposed combined beam path and a vertically disposed combined beam path, the camera arranged to receive light from one of said combined paths and a monitor device arranged to receive light from the other of said combined paths for monitoring and adjusting said optical system.

* * * * *